Dec. 3, 1940.    B. BERKMAN    2,223,543
MILKWEED FLOSS LIBERATION
Filed March 17, 1939    2 Sheets-Sheet 1

Dec. 3, 1940.  B. BERKMAN  2,223,543
MILKWEED FLOSS LIBERATION
Filed March 17, 1939  2 Sheets-Sheet 2

Inventor.
Boris Berkman
By Williams, Bradbury
McCalet & Hinkle
Attys.

Patented Dec. 3, 1940

2,223,543

UNITED STATES PATENT OFFICE 2,223,543

MILKWEED FLOSS LIBERATION

Boris Berkman, Chicago, Ill., assignor to Milkweed Products Development Corporation, Chicago, Ill., a corporation of Illinois Application March 17, 1939, Serial No. 262,421

8 Claims. (Cl. 19—1)

My invention relates to method and apparatus for separating the floss and seeds of the common milkweed and of related plants, from the pods normally enclosing the same.

One object of my invention is the separation of the floss and seeds from the pods.

Another object of my invention is to provide a method of curing the milkweed pods after harvesting to facilitate the opening of the pods and separation of the contents and to prevent fermentation and decomposition of the pods.

Another object of my invention is to provide a method of separating the floss from the seeds to which it is normally attached.

Another object of my invention is to provide means for collecting and accumulating air-borne milkweed floss.

Another object of my invention is the production, as a new article of manufacture, of a milkweed floss free of the seeds normally attached thereto and of the pods normally surrounding the same, having the novel characteristics of great looseness, elasticity, and insulating value, composed of smooth hollow fibers containing approximately sixty percent of cellulose.

Further objects and advantages of my invention will become apparent upon reading the following specification in conjunction with the attached drawings, of which:

Figure 1:
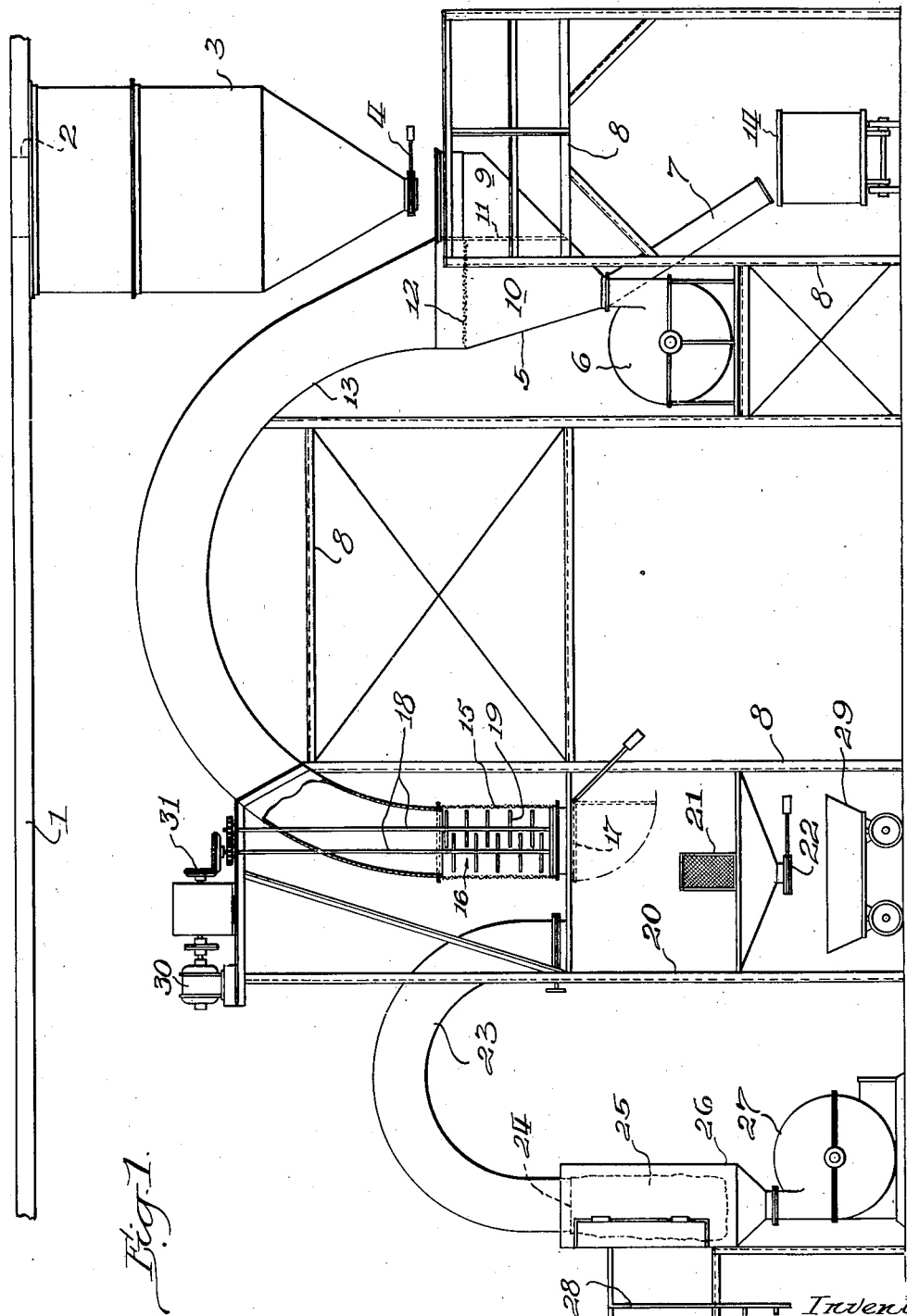
Fig. 1 is an elevation of apparatus for carrying out the separation and collection of milkweed floss and seeds from the pods.

From time immemorial the lowly milkweed has been a source of annoyance to the industrious farmer, gardener, and husbandman. This common weed is marked by its persistence, hardiness, adaptability to extremely unfavorable conditions, and remarkable reproductive facilities, all of which qualities have heretofore contributed only to its reputation as an agricultural pest, for it is both detrimental to cultivated crops and poisonous to animals. Therefore, with the exception of some strikingly unsuccessful attempts to produce rubber from its milky juice, the plant has been subject more to attempts at extermination than to scientific appraisal and utilization of its multitudinous valuable properties.

The common milkweed is a perennial plant, three to seven feet tall, having hollow woody stalks nourished by an extensive root system. The stalks are suitable for the manufacture of a superior grade of insulation board and pressed board according to a method disclosed in a copending patent application. The extensive root system of the milkweed makes this plant preeminently suitable for the control of soil erosion. A system of erosion control based on the use of milkweed plantings has been developed and is the basis of another copending patent application.

The stalks of the milkweed bear a plurality of pods, from five to thirty-five, which reach maturity in autumn, usually during the month of October in the middle western or north central regions of the United States. These pods contain the multitude of seeds with which the plant reproduces itself. Each individual seed is fitted with a group of seed hairs, forming a "parachute" which, because of its voluminous lightness, is caught by the breeze as the enclosing pod bursts, and is blown far from the mother plant, carrying the attached seed along with it. The pods burst soon after maturity, scattering their contents, which are sometimes carried miles away by the wind. The present notoriety of the milkweed is due partly to this efficient method of scattering its seeds.

Contemplative students of nature have often speculated upon the commercial possibilities of the seed and of the beautiful silky floss of the milkweed plant, but have never attempted practically to realize them. At least, I am not aware of any successful attempts so to do. I have found, on the other hand, that both the floss and the seeds of the milkweed have many valuable properties, whose utilization is subject, however, to the successful solution of the problem of economically opening the still closed pods after their harvest, separating the seeds and floss therefrom, and separating the floss from the seeds to which it is normally attached.

The seeds are valuable for their content of semi-drying oil, of a quality akin to soya-bean oil, and their high protein content which indicates potential value as an animal food. The seeds are, in fact, similar in many other respects to soya beans. The utilization of the seeds is not an object of this patent, however, and I shall therefore not amplify the discussion thereof, except to point out that up to the present the commercial utilization of the seeds has awaited the disclosure of a successful method of separating them from the pods and the floss, such as the one I am about to describe.

I have found that the floss possesses a large number of unique properties, which make it suitable for such uses as the production of felt and batting, stuffing pillows or upholstery, and as an insulating wool for refrigerator cars, trucks, and trailers, and the hollow walls of dwelling houses.

The attributes of milkweed floss which so admirably qualify it for these uses are its elasticity or springiness, which cause it to fill confined spaces and which prevents packing of the floss after long periods of time; its low coefficient of heat conductivity, which is due partly to the air spaces between the fibers, and partly to the air within the hollow fibers themselves; its light weight; and its cellulose content of approximately sixty percent which makes for permanency and freedom from decomposition and attack by vermin. The properties of milkweed which have been reiterated above will immediately bring Kapok to the mind of those skilled in the vegetable fiber art. Indeed, the similarity of the two fibers is remarkable. Milkweed floss is somewhat superior to Kapok in many respects, however. For instance, its coefficient of heat transmission is lower than that of Kapok.

Milkweed floss is undoubtedly superior to Kapok from the standpoint of agricultural economics. Kapok must be imported from Java or the Philippines, where it is produced in a very haphazard manner by the natives. There is much variation in the quality of the fiber, which is often due to adulteration. The Kapok tree is not a prolific bearer and requires about eight years to reach maturity. The trees are easily damaged, and picking of the Kapok pods is difficult. Kapok trees are useful only for the production of floss. Milkweed, on the other hand, is a perennial yielding yearly crops, and twice yearly crops in the South. A large yield of floss per acre is obtainable. Milkweed yields many other valuable products in addition to the floss, such as the insulating wallboard, pressed board, drying oil, and animal food previously alluded to. Furthermore, the outer or bast fibers of the stalk, which contain about 93% of alpha-cellulose, can be separated by a process disclosed in one of my copending patent applications, for use in the manufacture of rayon, Cellophane, dynamite, and textile fibers. The remaining woody fiber can be converted into paper and plastics. The milkweed crop is easily harvested. Milkweed is an American crop capable of producing untold benefits to the American farmer, and not subject to the uncertainties attending the importation of foreign raw materials.

My method of floss liberation is applicable to most species of the genus Asclepias of the family Asclepiadaceae, although I have found that the common milkweed *A. syriaca*, and the swamp milkweed, *A. incarnata* are especially suitable. These species yield pods containing about five grams of floss and ten grams of seed. Experiments have, however, been initiated that are directed to the production of a milkweed suitable for commercial cultivation, which will yield still more floss and seed.

A plant for separating the floss and seeds from milkweed pods according to my invention comprises four important units, namely the curing floor, the pod separating machine, the seed and floss separator, and the floss collector. I shall describe these units separately, but shall indicate their cooperation during the course of the description.

The curing floor 1 shown in Fig. 1 may be any dry warehouse or loft floor upon which the pods are spread to dry. The pods must be spread as a thin layer, preferably on racks which will allow free circulation of dry air over the pods. It is often advisable to preheat the air and forcibly to circulate it over the pods in order to insure adequate drying.

I have found that the proper degree of curing is of the utmost importance to the successful utilization of milkweed pods. Proper curing of the pods causes them to burst readily and makes possible the efficient separation of the floss from the seeds to which it is normally attached. Curing of the pods is completed when their moisture content is approximately thirty per cent by weight. The moisture content is rather critical, for separation of the floss and seeds and opening of the pods becomes difficult if the moisture content specified above is exceeded.

Cured pods may conveniently be stored in a large hopper 3 into which they are charged through a hatch 2 in the curing floor. Pods are removed from hopper 3 as required by manipulating the gate 4 closing the lower end of the hopper 3.

The pod separator consists of a large hopper shaped container 5 whose lower constricted end is connected to a powerful blower 6, and also to a chute 7. The blower 7 and pod separator 5 are severally supported upon a suitable framework 8. The hopper 5 is divided into receiving compartment 9 and an agitating compartment 10 by means of a door 11. The top of the agitating compartment is covered with a grating 12 and communicates with a duct 13 of generous diameter. The grating 12 has openings which allow floss and seeds to pass but which retain the empty pods.

In operation the compartment 9 is filled with a supply of pods. The door 11 is opened, allowing the pods to drop into the agitating chamber 10, and the door is closed again. The blower 6 is then set in operation, creating a strong blast of air which violently agitates the pods in the separator, tumbling them against each other and against the grating. Because the pods have been cured they readily burst, discharging their contents, which are blown through the grating 12 and pass into duct 13. The relatively heavy empty pods find their way into chute 7, and are collected in a waiting lorry 14. The operation of the pod separator is necessarily intermittent, but by using a plurality of separators in the manner to be described in connection with Fig. 3, substantially continuous operation of the plant may be maintained.

The seeds and the floss attached thereto are carried to the agitating chamber 16 of the seed and floss separator 15. This chamber is constructed of materials pervious to air but retaining the floss. Such materials may suitably be screen wire backed with cloth. The bottom of chamber 16 is closed by a counterbalanced gate 17. The agitating chamber is fitted with a mechanical agitator consisting of two oppositely geared rotating shafts 18 fitted with smooth paddles 19 separated by at least the length of the floss fiber. The gate 17 opens into a large flotation chamber 20, having a ventilator screen 21 in one side thereof, and a gate 22 in the conical bottom thereof for the discharge of seeds.

A spacious duct 23 communicating with an exhaust fan enters the upper portion of the flotation chamber 20. This chamber, the agitation chamber 16, a motor 30, and a speed reducing transmission 31 for driving the two agitator shafts 18 are supported upon the same rigid framework 8 which supports duct 13 and the pod separator 5.

In operation the air-borne floss and seeds carried through duct 13 are collected in chamber 16, the air escaping through the pervious walls thereof. Gate 17 is normally closed so that a sufficient quantity of milkweed floss may accumulate in the chamber to engage the agitators. The revolving agitators effectively separate the floss from the seeds to which it is normally attached if proper curing of the pods has preceded this operation. It is important, however, that the agitators be smooth and their blades be smooth and openly spaced, because the floss, although it is springy and elastic, is readily injured if its individual fibers are subjected to extreme bending or shearing stresses. At intervals of sufficient duration to insure complete separation, small portions of the accumulated floss and seeds are discharged from the agitator into the flotation chamber 20 by the operation of gate 17. The seeds drop to the bottom of the chamber from which they may be removed at intervals to a waiting lorry 29 by opening gate 22. The floss is wafted up into the duct 23 by the current of air entering the flotation chamber 20 via ventilator 21 under the influence of the suction pump with which duct 23 communicates. This current of air is not strong enough however to carry along the seeds. The floss and seed separator may be operated continuously by keeping gate 17 opened slightly, or by some similar expedient, whereby a quantity of floss is at all times being subject to agitation in chamber 16. This is necessary because separation of floss and seed is effective only if the floss is somewhat packed.

Duct 23 terminates in a flange 24 to which may be tied a burlap sack 25 for receiving the air-borne floss from the flotation chamber. The end of the duct and the sack are enclosed in a housing 26 communicating with an exhaust fan 27. The housing is provided with a tightly fitting door yielding convenient access to the bag of floss. A suitable supporting platform may also be provided, as at 28.

In operation the air-borne floss from the air-flotation chamber 20 is sucked through duct 23 and into bag 25, where it is retained and where it accumulates and packs until the bag is full. The air is sucked through the bag and out of the housing 26 by the exhaust fan 27.

The floss collected in the bag 25 is a unique product. Although such floss has been experimentally produced prior to my invention by manually separating floss from milkweed seeds in small quantities, never before has a sufficient quantity been accumulated to display its peculiar characteristics in the mass, particularly its properties of heat insulation. Nor, to my knowledge, has a floss free from all seeds, pods, and impurities ever been prepared in quantity. Such a floss, having smooth, hollow, elastic fibers containing about sixty per cent of cellulose is a new product of manufacture resulting from the application of the methods I have described.

Figure 2:
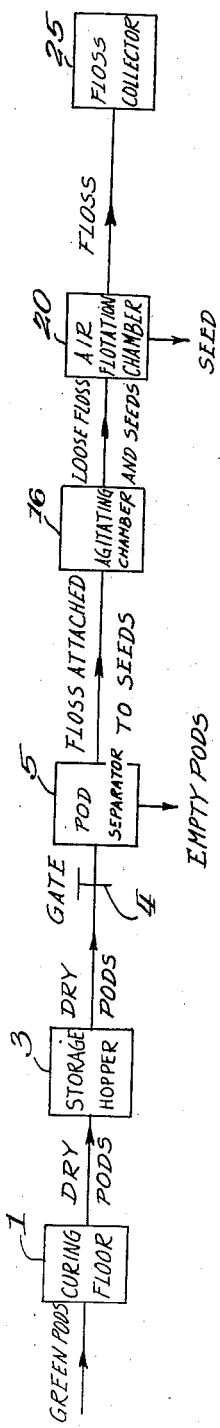
Fig. 2 is a flow sheet of my method of floss and seed separation and collection as carried out by the apparatus illustrated in Fig. 1.

The milkweed floss liberation plant illustrated in Fig. 1 is represented diagrammatically by the flow-sheet of Fig. 2. Ripe green pods are delivered to the curing floor and the dried pods after curing are stored in hopper 3, from whence quantities of pods are discharged into pod separator 5 by operating the gate 4. The seeds and the floss attached thereto are sent to the agitating chamber 16 after leaving the pod-separator 5. The free floss and seeds from the agitating chamber are sent to air flotation chamber 20 where the free floss is separated from the seeds. The floss is collected in the floss collector bags 25.

Figure 3:
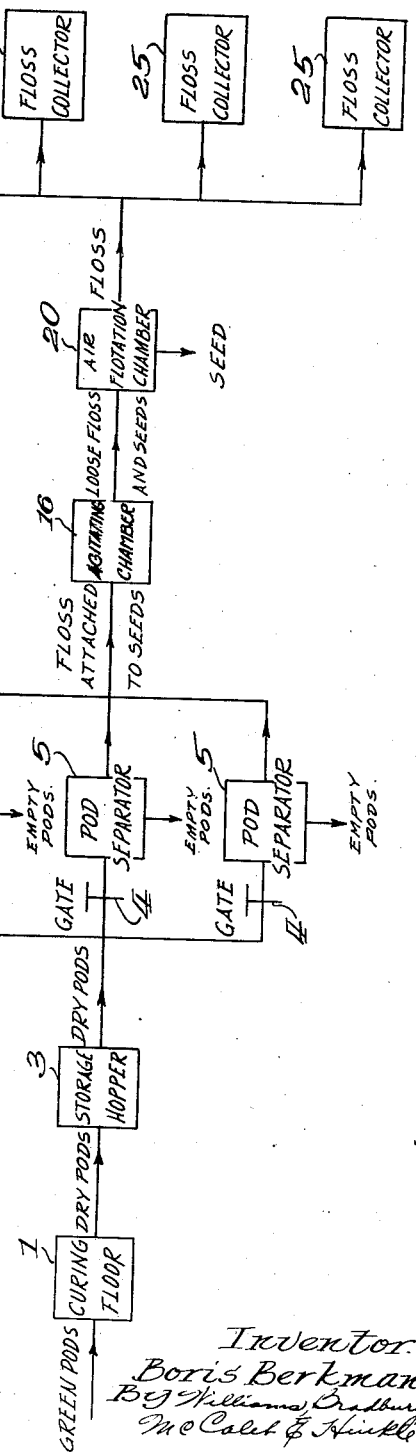
Fig. 3 is a flow sheet analogous to Fig. 2, but modified to illustrate how my methods can be adapted to continuous production.

The only operations in the above flow-sheet that cannot be operated continuously are the pod separation and the floss collection. Therefore, I have evolved a modified arrangement of my plant which permits continuous operation. The flow-sheet of Fig. 3 illustrates this arrangement. This flow-sheet is identical with Fig. 2 except that three pod separators are provided which are operated in rotation, so that pod separation is going on at all times, thus allowing the separators to be charged with pods without interrupting the continuous operation of the other apparatus. A plurality of floss collectors 25 are provided for a similar reason, so that full bags of floss may be replaced by empty bags without interrupting the flow of floss from the air flotation chamber 20.

I recognize that other modifications of the arrangement and construction of my apparatus are possible, therefore, I wish to be limited only by the following claims:

1. The method of separating milkweed floss and seeds from the pods comprising strong agitation of the milkweed pods by means of an air-blast whereby they are caused to burst and to discharge their content of floss and seeds, and blowing the floss and seeds by means of said air-blast through a multiplicity of openings effectively restraining passage of the empty pods.

2. The method of separating milkweed floss and seeds from the pods comprising curing of the milkweed pods by drying them until the pods can more readily be made to burst, strong mutual air agitation of the pods whereby they are caused to burst and to discharge their content of floss and seeds, and separation of the relatively light floss and seeds from the empty pods by means of a current of air.

3. The method of separating milkweed floss and seeds from the pods comprising dry curing of the milkweed, and strong mutural agitation of the cured pods by means of an air-blast whereby the pods are burst, and the floss and seeds are released from the pods, separated therefrom, and carried away by virtue of their light weight.

4. The method of separating milkweed floss and seeds from the pods comprising drying of the milkweed pods until their moisture content is approximately thirty per cent, mutual air agitation of the dried pods whereby they are caused to burst and to discharge their content of floss and seeds, and separation of the floss and seeds from the empty pods by air-flotation.

5. The method of preparing free milkweed floss, comprising curing the milkweed pods until their moisture content is approximately thirty per cent, strong agitation of the dried pods whereby they are caused to burst and to discharge their content of floss and seeds, air-flotation of the seeds and the floss attached thereto to separate them from the empty pods, accumulation of a quantity of said floss bearing seeds, mechanical agitation of the floss and seeds until substantially complete separation thereof has occurred, and collection of the free floss by air flotation.

6. The method of preparing free milkweed floss, comprising strong agitation of the dried milkweed pods whereby they are caused to burst and to discharge their content of floss and seeds, air-flotation of the seeds and the floss attached thereto to separate them from the empty pods, accumulation of a quantity of said floss bearing seeds, mechanical agitation of the floss and seeds until substantially complete separation thereof has occurred, and collection of the free floss of air flotation.

7. The method of preparing free milkweed floss, comprising curing the milkweed pods until their moisture content is approximately thirty per cent, strong agitation of the dried pods whereby they are caused to burst and to discharge their content of floss and seeds, air flotation of the seeds and the floss attached thereto to separate them from the empty pods, mechanical agitation of the floss and seeds until substantially complete separation thereof has occurred, and collection of the free floss by air flotation.

8. The method of preparing free milkweed floss, comprising strong agitation of the dried milkweed pods whereby they are caused to burst and to discharge their content of floss and seeds, air-flotation of the seeds and the floss attached thereto to separate them from the empty pods, mechanical agitation of the floss and seeds until substantially complete separation thereof has occurred, and collection of the free floss of air flotation.

BORIS BERKMAN.